US009675146B1

(12) United States Patent
Howell

(10) Patent No.: US 9,675,146 B1
(45) Date of Patent: Jun. 13, 2017

(54) FREE-STANDING SUPPORT SYSTEM

(71) Applicant: John D. Howell, Germantown, MD (US)

(72) Inventor: John D. Howell, Germantown, MD (US)

(*) Notice: Subject to any disclaimer, the term of this patent is extended or adjusted under 35 U.S.C. 154(b) by 0 days.

(21) Appl. No.: 15/068,927

(22) Filed: Mar. 14, 2016

(51) Int. Cl.
| | |
|---|---|
| *F16M 11/38* | (2006.01) |
| *A45B 11/00* | (2006.01) |
| *A45B 23/00* | (2006.01) |
| *A45B 25/00* | (2006.01) |
| *F16M 11/24* | (2006.01) |
| *F16M 11/28* | (2006.01) |
| *F16M 11/10* | (2006.01) |
| *F16M 11/18* | (2006.01) |
| *F16M 11/04* | (2006.01) |
| *A45F 3/44* | (2006.01) |
| *E04H 12/22* | (2006.01) |

(52) U.S. Cl.
CPC .............. *A45B 25/00* (2013.01); *A45B 23/00* (2013.01); *A45F 3/44* (2013.01); *E04H 12/2238* (2013.01); *E04H 12/2284* (2013.01); *F16M 11/041* (2013.01); *F16M 11/10* (2013.01); *F16M 11/18* (2013.01); *F16M 11/242* (2013.01); *F16M 11/28* (2013.01); *A45B 2023/0006* (2013.01); *A45B 2023/0012* (2013.01); *F16M 2200/00* (2013.01); *F16M 2200/021* (2013.01); *F16M 2200/08* (2013.01)

(58) Field of Classification Search
CPC . A45B 25/00; A45B 23/00; A45B 2023/0006; A45B 2023/0012; F16M 11/10; F16M 11/18; F16M 11/242; F16M 11/28; F16M 11/34; F16M 2200/021; F16M 11/245; F16M 11/36; F16M 2200/00; F16M 2200/08
USPC ...... 248/511, 54, 163.1, 165, 166, 345, 519, 248/530, 533, 534, 127, 188.6; 135/16, 135/19, 20.1, 135; 220/737
See application file for complete search history.

(56) References Cited

U.S. PATENT DOCUMENTS

| | | | | |
|---|---|---|---|---|
| 2,668,682 A | * | 2/1954 | Dalton | F16M 11/34 |
| | | | | 182/109 |
| 5,794,899 A | * | 8/1998 | Tamllos | F41A 23/12 |
| | | | | 248/166 |

(Continued)

*Primary Examiner* — Tan Le
(74) *Attorney, Agent, or Firm* — Andrew M. Calderon; Roberts Mlotkowski Safran Cole & Calderon, P.C.

(57) ABSTRACT

The present disclosure relates generally to a free-standing support system and, more particularly, to a portable and adjustable free-standing support system for supporting an umbrella or the like. The stand includes at least one pole, a holding clamp connected to the at least one pole, and a base connected to the at least one pole. The base includes a hub, a plurality of legs pivotally connected to the hub, adjustment handle mechanisms connected to each of the respective legs structured to selectively lock each of the plurality of legs at a fixed position with respect to the hub, and a plurality of adjustable feet. Each the adjustable feet are connected to a respective one of the plurality of legs and include a first end including a head and a second end including a spike, wherein each of the adjustable feet rotate between a first position which has the spike in a stowed position within each of the plurality of legs and a second position, wherein the spike extending from each of the plurality of legs.

18 Claims, 6 Drawing Sheets

(56) References Cited

U.S. PATENT DOCUMENTS

| | | | | |
|---|---|---|---|---|
| 5,937,881 | A | * | 8/1999 | Villa ................... A45B 23/00 135/135 |
| 6,007,032 | A | * | 12/1999 | Kuo ................... F16M 11/10 248/125.1 |
| 6,283,421 | B1 | * | 9/2001 | Eason ................... G10G 5/00 248/170 |
| 6,585,199 | B1 | * | 7/2003 | Yu ................... F16M 11/28 248/163.1 |
| 8,317,141 | B2 | * | 11/2012 | Fischer ................ F16M 11/36 248/168 |
| 8,534,620 | B2 | * | 9/2013 | Zierer ................... F16M 11/28 248/163.1 |

* cited by examiner

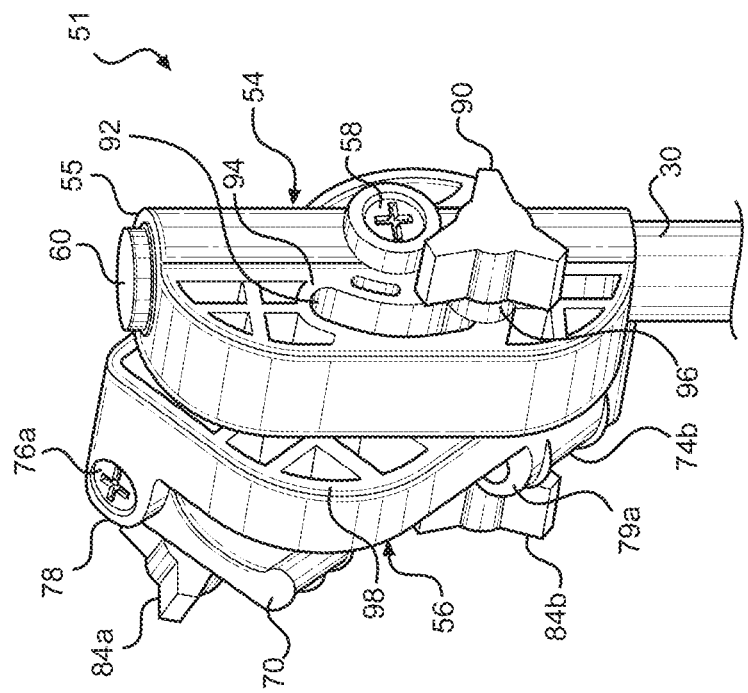
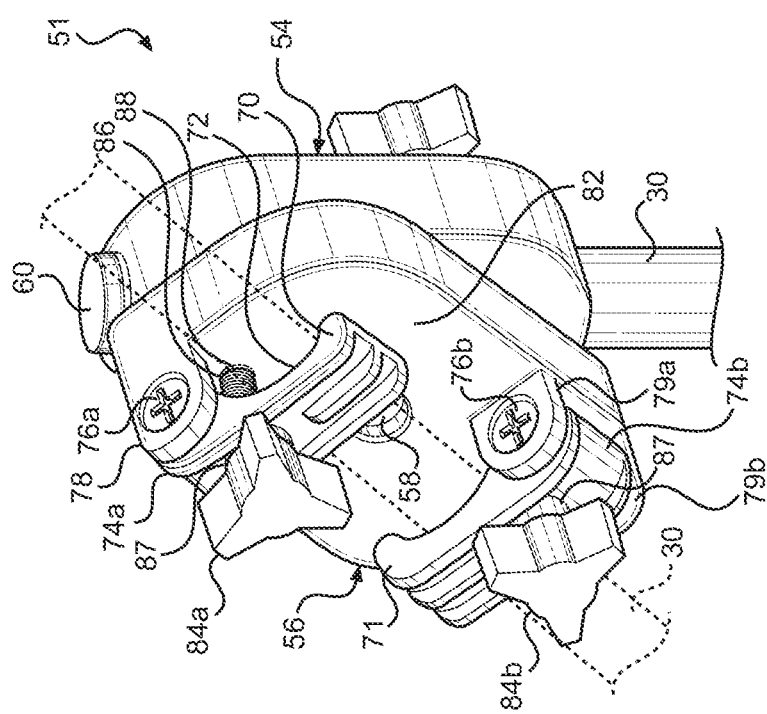
FIG. 3
FIG. 2

FREE-STANDING SUPPORT SYSTEM

FIELD OF INVENTION

The present invention relates generally to a free-standing support system and, more particularly, to a portable and adjustable free-standing support system for supporting an umbrella or the like.

BACKGROUND

According to 2009 findings of the National Cancer Institute, more than one million people are diagnosed with non-melanoma skin cancer in the United States every year. Further, the hours between 10 AM and 4 PM daylight savings time are the most hazardous times for ultra violet exposure. The risk of skin damage can be reduced by seeking shade. However, shade options for those participating in outdoor activities may be limited.

One option to provide shade during an outdoor activity is to set up a canopy. However, canopies may be heavy and their set-up burdensome. Further options include hand-held umbrellas or clamping umbrellas adapted to clamp to chairs. Such options have limited functionality.

SUMMARY

In an aspect of the invention, a stand comprises at least one pole, a holding clamp connected to the at least one pole, and a base connected to the at least one pole. The base includes a hub, a plurality of legs pivotally connected to the hub, and adjustable handle mechanisms connected to each of the respective legs and structured to selectively lock each of the legs at a fixed position with respect to the hub. The base further includes a plurality of adjustable feet, each of which are connected to a respective one of the plurality of legs. The adjustable feet include a first end comprising a head and a second end comprising a spike, wherein each of the plurality of adjustable feet rotate between a first position which has the spike in a stowed position within each of the plurality of legs and a second position, wherein the spike extends from each of the plurality of legs.

In another aspect of the invention, a free-standing support system comprises a telescoping pole assembly, and a base assembly connected to the telescoping pole assembly at a first end thereof. The base assembly includes a hub connected to the telescoping pole assembly and a plurality of pivotally connected legs connected to the hub, which are rotatable between an extended position and a stowed position. A holding clamp is connected to the telescoping pole assembly. The holding clamp has a stationary portion connecting to a top portion of the telescoping pole assembly, a rotating portion rotatably mounted to the stationary portion, and a clamp assembly provided on a surface of the rotating portion which is structured to secure a shaft between the clamp assembly and an opposing surface.

In yet another aspect of the invention, a free-standing support system comprises: at least one telescoping pole assembly; and a holding clamp connected to the at least one telescoping pole assembly. The holding clamp being structured to secure a shaft portion of an umbrella and which comprises: a stationary portion having a shaped slot and connecting to the at least one telescoping pole assembly; a rotating portion which is rotatable about the stationary portion at an angle corresponding to that of the shaped slot; and opposing clamping mechanisms attached to the rotating portion and which are engageable with a surface of the rotating portion. A base is connected to the at least one telescoping pole assembly. The base comprises: a hub; legs pivotally connected to the hub; handles connected to each of the respective legs to selectively lock each of the legs at a fixed position with respect to the hub; and feet connected to a respective one of the legs. The feet include a first end comprising a head and a second end comprising a spike. The feet are rotatable to rotate between a first position wherein the spike is stowed with the leg and a second position wherein the spike extends from the respective feet.

BRIEF DESCRIPTION OF THE DRAWINGS

The present invention is described in the detailed description which follows, in reference to the noted plurality of drawings by way of non-limiting examples of exemplary embodiments of the present invention.

FIG. 2 is a front perspective view of a holding clamp of the free-standing support system of FIG. 1.

FIG. 3 is a back perspective view of the holding clamp of FIG. 2 in accordance with aspects of the present invention.

DETAILED DESCRIPTION

The present invention relates generally to a free-standing support system and, more particularly, to a portable and adjustable free-standing support system for supporting an umbrella or the like. Implementations of the present invention can be used to secure an umbrella in an extended and upright position, at different angles, thereby providing a user with protection from the sun and rain, and enhance a user's outdoor experience during work, sports, recreation and other social activities. That is, advantageously, the free-standing support system described herein provides a sturdy and adjustable free-standing support system that allows for easy set up on multiple surfaces, aids in protecting users from sun and rain, and enhances a user's outdoor experience.

In embodiments, the free-standing support system is implemented with an umbrella. The free-standing support system includes a sturdy base with a tripod leg design that allows for easy set up on multiple surfaces, and subsequent stowage when not in use. The free-standing support system is height adjustable with easy grip handles and, for example, a rust proof surface such as aluminum, paint or other finishes. The free-standing support system is portable and lightweight, for easy packing, transportation and carrying. The free-standing support system allows for hands-free use, allowing the user to multi-task (e.g., cooking, drinking, working, photography, calling, socializing, etc.) while still being protected from the elements.

In embodiments, the free-standing support system of the present invention can be utilized for multiple applications across industries (e.g., police, surveyors, parking attendants, first aid and disaster relief, sports, etc.). Advantageously, the free-standing support system provides a cost savings of 10-30% compared to canopies and other patio/sports umbrella products. Further, the stand and umbrella combination of the present invention can be made available in multiple colors, designs and materials.

Figure 1:
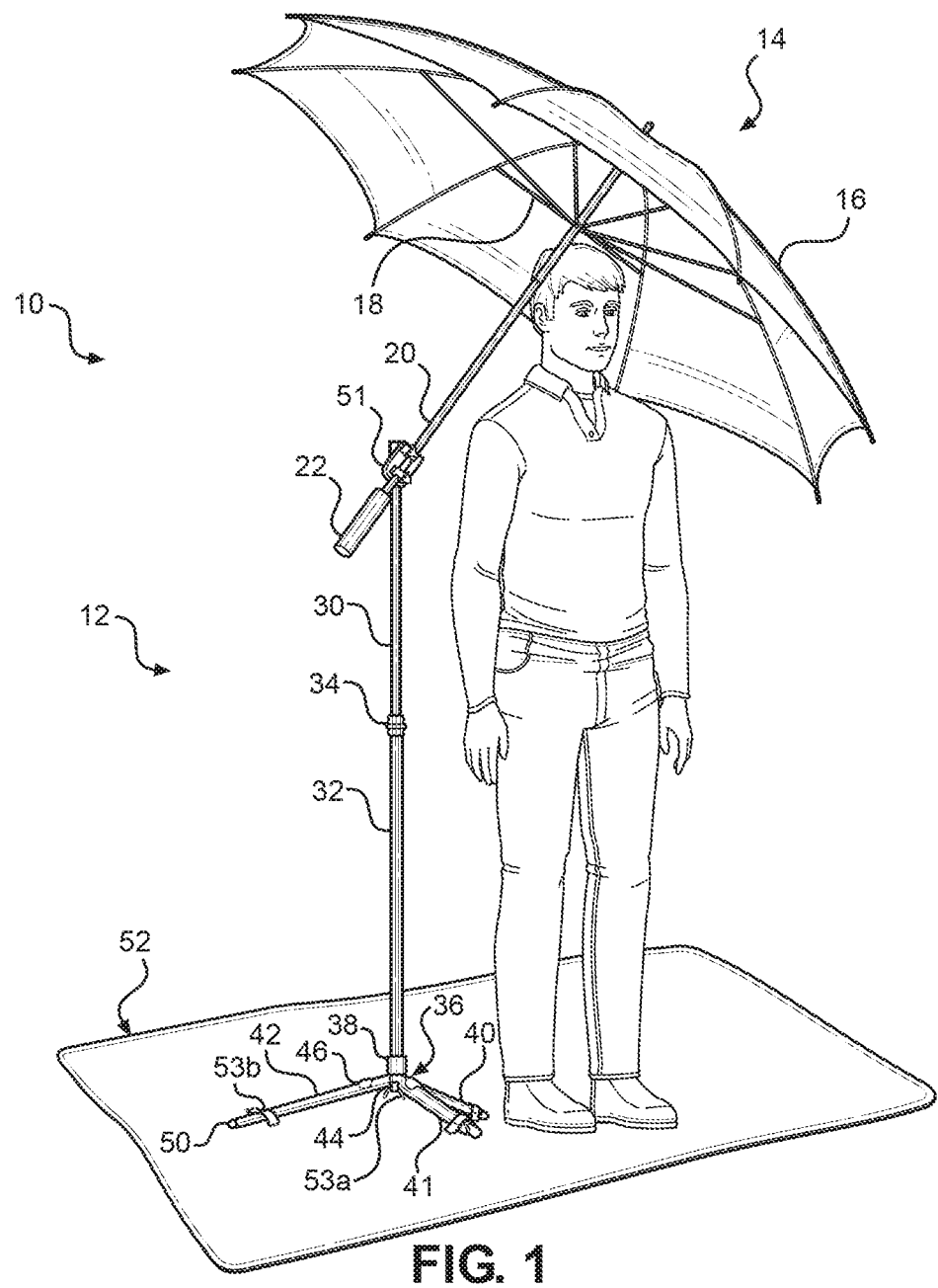
FIG. 1 is a front perspective view of a free-standing support system in accordance with aspects of the present invention.

FIG. 1 is a front perspective view of a free-standing support system in accordance with aspects of the present invention. In FIG. 1, the free-standing support system 10 comprises a stand assembly 12 for supporting an umbrella 14. While discussed with reference to an umbrella 14, it should be understood by those of skill in the art that the free-standing support system 10 may be utilized to hold other equipment such as, e.g., a camera or lighting equipment.

In embodiments, and by way of a non-limiting, illustrative example, the free-standing support system 10 can be utilized with any standard umbrella 14. In embodiments, the umbrella 14 can include a waterproof opaque nylon canopy 16 supported by a foldable frame 18 on a shaft 20 with an easy-to grip handle 22. The canopy 16 can also be of other materials, and hence the use of a waterproof opaque nylon canopy should not be considered a limiting feature. The foldable frame 18 and the shaft 20 can be rust proof, as an example. The canopy 16 preferably has a diameter sufficient to shade two or more adults and the shaft 20 may be a variety of standard diameters, e.g., 1.5 inches.

The stand assembly 12 includes at least one pole extending from a base. For example, as shown in FIG. 1, the stand assembly 12 includes a top pole 30 in telescoping engagement with a bottom pole 32 via an adjustable clamp 34. In embodiments, the clamp 34 is a turnable, friction type clamp, which is designed to hold the top pole 30 at a certain height by means of friction. In turn, the bottom pole 32 is held in engagement with a base 36 via a clamp 38. As with the claim 34, the clamp 38 is a turnable, friction type clamp, which is designed to hold the bottom pole 30 at a certain height by means of friction.

In embodiments, the top pole 30 is a ¾ inch aluminum pole painted with a rust-proof finish and bottom pole 32 is a 1 inch aluminum pole painted with a rust-proof finish; although other dimensions, finishes, etc. are also contemplated herein. Preferably, the top and bottom poles 30 and 32 can be extended to accommodate the height of a standing person (e.g., six feet six inches (6'6"), or retracted to accommodate the height of a seated person (e.g., four (4) feet).

In embodiments, the base 36 is in the form of a tripod base and includes a first leg 40, a second leg 41 and a third leg 42, each pivotally connected to the base 36 at a hub portion 44. In embodiments, each of the legs 40-42 includes a mechanism for locking a respective leg 40-42 in position with respect to hub portion 44. The legs 40-42 also include adjustable feet mechanisms 50 as described in more detail herein. In embodiments, the mechanism for locking of the legs 40-42 comprises an adjustable tensioning handle 46 for locking a respective leg 40-42 at a desired position with respect to the hub portion 44.

In embodiments, a holding clamp 51 is attached to the top pole 30 which is structured and designed to enable a user to selectively secure various types and sizes of umbrellas to the stand assembly 12. In embodiments, free-standing support system 10 also includes a ground support mat 52 including loops 53a, 53b adapted to connect the mat 52 to the base 36.

In operation, the adjustable clamp 34 is secured to the bottom pole 32 and may be twisted to selectively clamp about the top pole 30. Similarly, the adjustable clamp 38 is secured to the base 36 and may be twisted to selectively clamp about the bottom pole 32. When a user wishes to adjust the overall height of the stand assembly 12, the user may twist the top clamp 34 in a first directed such that the top clamp 34 releases the top pole 30, enabling a user to slide the top pole 30 within an interior portion of the bottom pole 32 in a telescoping manner until a desired height of top pole 30 is achieved. The user can then twist the top clamp 34 in a second directed to tighten the top clamp 34 about the top pole 30 to fix the top pole 30 in a desired position with respect to the bottom pole 32.

The position of the bottom pole 32 with respect to the base 36 may be similarly adjusted. More specifically, the user may twist the bottom clamp 38 in a first direction such that the bottom clamp 38 releases the bottom pole 32, enabling a user to slide the bottom pole 32 within an aperture extending through the hub portion 44 of the base 36 until the desired position of bottom pole 32 with respect to base 36 is achieved. The user can then twist the bottom clamp 38 in a second directed to tighten the bottom clamp 38 about the bottom pole 32 to fix the bottom pole 32 in a desired position with respect to the base 36. In embodiments, a bottom end of the bottom pole 32 may extend past a bottom of the hub portion 44. In this way, the end of the bottom pole 32 may be positioned to be in contact with a ground surface, providing additional support to the base 36. (See, e.g., FIG. 6). In further embodiments, an end cap 55 (shown in FIGS. 4A and 4B) is fixed to a bottom end of the bottom pole 32 and limits the passage of the bottom pole 32 through the hub portion 44.

FIGS. 2 and 3 show details of a holding clamp 51 in accordance with aspects of the invention. More specifically, FIG. 2 is a front perspective view of the holding clamp 51; whereas, FIG. 3 is a back perspective view of the holding clamp of FIG. 2. In particular, the holding clamp 51 includes a first portion 54 for securing the holding clamp 51 to the top pole 32, and a second portion 56 for securing the shaft 20 of an umbrella 14 to the holding clamp 51, itself.

In embodiments, the first portion 54 includes a channel 55 extending through a length thereof, into which an upper end of the top pole 32 is received. A fastener 58 extends through the first portion 54, the top pole 32, and the second portion 56 to secure the umbrella holding clamp 51 to the top pole 32, while enabling the second portion 56 to rotate with respect to the first portion 54, about the fastener 58. A finishing plug 60 can be inserted into the channel 55 of the first portion 54 to prevent debris from entering the channel 55 or the hollow portion of the top pole 32. The second portion 56 is rotatable about an axial length of the pole, with respect to the first portion 54 which remains stationary, as described in more detail herein.

The umbrella holding clamp 51 also includes a mechanism for clamping an umbrella shaft 20 thereto. In the embodiment shown in FIGS. 2 and 3, the mechanism for clamping includes first and second securing arms 70 and 71 extending from the second portion 56 of the umbrella holding clamp 51. In embodiments, the first and second securing arms 70 and 71 each have curved inner surfaces 72 adapted to engage and retain the umbrella shaft 20. An end portion 74a of the first securing arm 70 is pivotally attached by a fastener 76a to opposing flanges, one of which can be seen at reference numeral 78 in FIGS. 2 and 3. Opposing flanges 78 extend from a surface 82 of the second portion 56 at an upper side thereof. Similarly, an end portion 74b of the second securing arm 71 is pivotally attached by a fastener 76b to opposing flanges 79a and 79b extending from the surface 82 of the second portion 56 at a lower side thereof.

In this way, the first securing arm 70 and the second securing arm 71 can extend from opposing sides of the surface 82 of the second portion 56.

A first adjustment knob 84a having a threaded shaft 86 extends through an aperture 87 in the first securing arm 70 and into a threaded aperture 88 formed in the body of the second portion 56. A second adjustment knob 84b has a similar structure to the adjustment knob 84a. More specifically, the second adjustment knob 84b includes a threaded shaft extending through an aperture 87 in the second securing arm 71 and into a threaded aperture formed in the body of the second portion 56.

As shown in FIG. 3, the mechanism for rotating the umbrella shaft 20 is provided as a rotation knob 90 and an arcuate or crescent shaped slot 92. In embodiments, the rotation knob 90 can include a lock washer. In embodiments, the rotation knob 90 includes a threaded shaft 96 extending through the slot 92 formed within a back surface 94 of the first portion 54, and into an aperture in a back side surface 98 of second portion 56.

The manner in which umbrella holding clamp 51 can be utilized will now be discussed with reference to FIGS. 2 and 3. As previously noted, the end portion 74a of the first securing arm 70 is pivotally attached by the fastener 76a to the opposing flanges 78, and threaded shaft 86 of the first adjustment knob 84a extends through the first securing arm 70 and into threaded aperture 88 of the second portion 56. The position of the first adjustment knob 84a with respect to the surface 82 of the second portion 56 can be adjusted to enable the first securing arm 70 to pivot about the fastener 76a. More specifically, if a user wishes to pivot the first securing arm 70 away from the surface 82, such as when a user is inserting an umbrella shaft 20 in the umbrella holding clamp 51, the user can turn the knob 84a in a first direction and the engagement of the threaded shaft 86 with the threaded aperture 88 will cause the knob 84a to move away (loosen) from the surface 82 of the second portion 56 to an extended position. Similarly, the user can turn the knob 84b in the first direction to cause the knob 84b to move away from the surface 82. When the knobs 84a, 84b are in an extended position, the first and second securing arms 70 and 71 may be moved away from the surface 82. In this way, a user can slide an umbrella shaft 20 between surface 82 and inner surfaces 72 of the first and second securing arms 70 and 71. Thereafter, the knobs 84a and 84b are each turned in a second direction to cause the knobs to move towards surface 82 and engage the respective first and second securing arms 70 and 71. By tightening the knobs 84a and 84b against the first and second securing arms 70 and 71, the first and second securing arms 70 and 71 will clamp against the surface of the umbrella shaft 20, thereby securing the umbrella shaft 20 to the umbrella holding clamp 51.

In embodiments, the holding clamp 51 is configured such that the umbrella shaft 20 connected thereto can be held at a variety of angles with respect to vertical. In embodiments, for example, the rotation knob 90 and crescent shaped slot 92 provide for a tilt adjustment of +/−40 degrees; although other degrees of adjustment are contemplated herein. More specifically, when a user wishes to adjust the angle of the second portion 56, and thereby the angle of the umbrella shaft 20 attached thereto, the user can turn the rotation knob 90 in a first direction to move the knob 90 from a locked position to an unlocked (loosened) position. Once in an unlocked position, the shaft 96 slide within the slot 92 to a desired position, and then the knob 90 can be turned in a second direction to move the knob 90 to the locked position. The shaft 96 of the knob 90 is secured to the second portion 56. Thus, as the shaft 96 travels along a length of the crescent shaped slot 92, the connection of the shaft 96 to second portion 56 causes the second portion 56 to tilt.

Figure 4A:
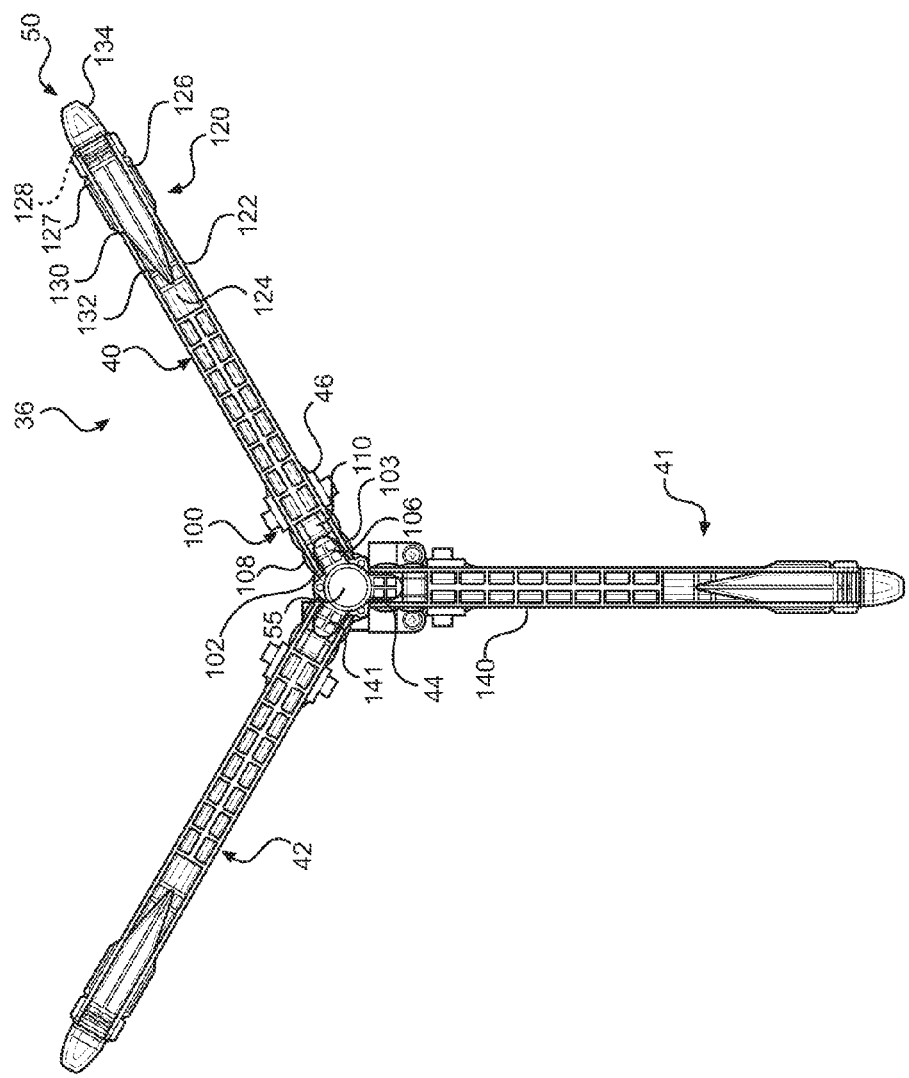
FIGS. 4A and 4B show bottom views of a base of the free-standing support system in accordance with aspects of the present invention.
Figure 4B:
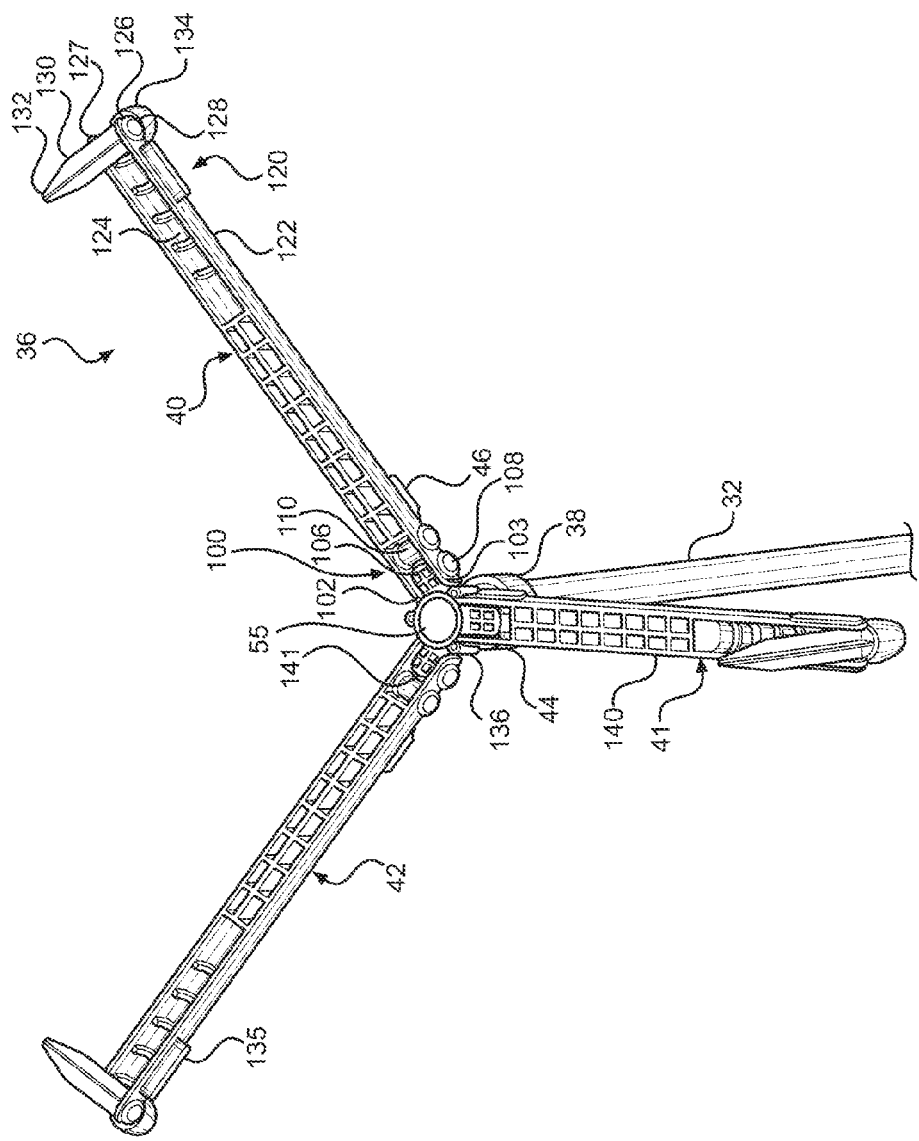

FIGS. 4A and 4B will now be referenced with respect to details of the base 36 in accordance with aspects of the invention. In particular, FIGS. 4A and 4B are bottom views of the base of the free-standing support system in accordance with aspects of the present invention. As previously discussed, the base 36 includes legs 40-42, each including an adjustable foot mechanism 50. The legs 40-42 are identical, such that only a detailed discussion of the components of the first leg 40 will be discussed herein.

As depicted in FIG. 4A, the first leg 40 includes a first end 100 having opposing flanges 102, 103 rotatably connected to a lobe 106 of the hub portion 44 through a fastener 108. With this configuration, the first leg portion 40 is able to rotate with respect to the hub portion 44. In embodiments, the adjustable tensioning handle 46 (e.g., tightening handles) includes an engagement portion (e.g., cam portion) 110 pivotally secured to an underside of leg 40 by a fastener 111 (depicted in FIG. 5). The engagement portion 110 can be pivoted through tensioning handle 46 to selectively engage the lobe 106 in order to selectively lock the first leg 40 at a desired angle with respect to hub portion 44.

The first leg 40 also includes a second end 120 having an adjustable foot mechanism 50 rotatably attached thereto. More specifically, the first leg 40 includes side wall 122 defining a recessed channel 124 on an underside thereof. The adjustable foot mechanism 50 is rotatably connected to opposing flanges 126, 127 extending from or integral with the side wall 122 by a fastener 128. Each adjustable foot mechanism 50 includes a shaft 130 tapering to a point or spike 132 at a first end and a head 134 at a second, opposing end. With this configuration, the foot 50 can be rotated between a first position (depicted in FIG. 4A) and a second position (depicted in FIG. 4B). In the first position, the shaft 100 and spike 102 are housed within the channel 124 and the head 104 provides a supporting surface for free-standing umbrella system 10. In the second position, the spike 102 is pointed in an outward position such that the spike 102 can be inserted into a ground surface to secure the free-standing support system 10 in place.

In embodiments, the adjustable foot mechanism 50 is sized to snap-fittingly engage with the channel 124 to retain the adjustable foot mechanism 50 within the channel 124 in the first position. Further, in embodiments, each leg 40, 41 and 42 includes leg grip strips 135 extending from opposing sides of the leg to provide an improved gripping surface for a user to aid the user in extracting spikes 132 from the ground.

Preferably, the shaft 100 comprises a material of sufficient stiffness to enable the spike 102 to be driven into the ground. In embodiments, the head 104 is comprised of rubber or other high-friction material, providing the adjustable foot mechanism 50 with the ability to grip a ground surface and prevent unintentional shifting of the free-standing umbrella system 10 when the adjustable foot mechanism 50 is in the first position. In embodiments, legs 40-42 and hub 44 are constructed of light weight aluminum with ribs 140, 141 for strength.

As best seen in FIG. 4B, the base 36 may also include a plurality of hooks 136 extending from the hub 44. For example, FIG. 4B depicts three hooks 136 spaced about the hub 44. The hooks 136 provide a mechanism for securing the base 36 to a support surface, such as mat 52. In embodiments, the mat 53 includes loops 53a, 53b (depicted in FIG. 1) which can be secured about the hooks 136 and/or the legs 40-42 to secure base 36 to mat 53. It can be understood that the hooks 136 allow for more stability of the base 36 when anchored to the mat 52 via the loops 53a, such as during windy weather conditions or the like. Likewise, the stability of the base can be improved by securing loops 53b of the mat 53 about the legs 40-42.

Figure 5:
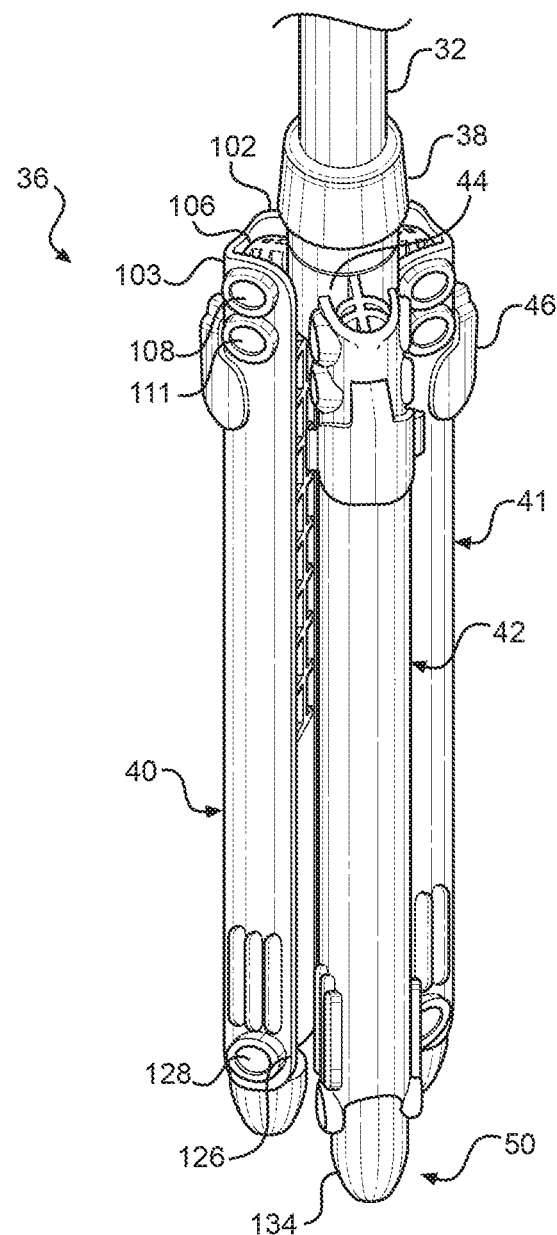
FIG. 5 is a perspective view of a base of the free-standing support system in a stowed position in accordance with aspects of the present invention.

In embodiments, the legs 40-42 of the base 36 are configured to rotate from a support position depicted in FIG. 1 to a stowed positioned depicted in FIG. 5. Further, in embodiments, the stand assembly 12 has an overall storage length of 36 inches when in the stowed position; although other dimensions are also contemplated herein. As depicted, in one exemplary embodiment, a length of each of the first, second and third legs 40-42 is parallel to a length of poles 30 and 32 when in the stowed position. In embodiments, a mechanism for locking, such as tensioning handle 46, can be utilized to lock the legs 40-42 at a desired angle anywhere from 5-90 degrees, as examples.

FIG. 5 depicts the legs 40-42 locked or stowed at an angle of 90 degrees in the stowed or closed position, while FIG. 1 shows legs 40-42 in an extended position (which can be locked) at an angle of approximately 15 degrees. The ability of each individual leg 40-42 to be locked at a select angle permits a user to adjust the base 36 depending on the topography of a particular support surface. For example, the legs 40-42 can be locked at different angles with respect to the hub portion 44 if the base 36 is being set up on a hillside with sloping topography. Further, a user can choose to utilize either the slip-resistant head 134 or the spike 132 of each foot 50, depending on conditions of a particular location (e.g. topography and wind conditions).

Figure 6:
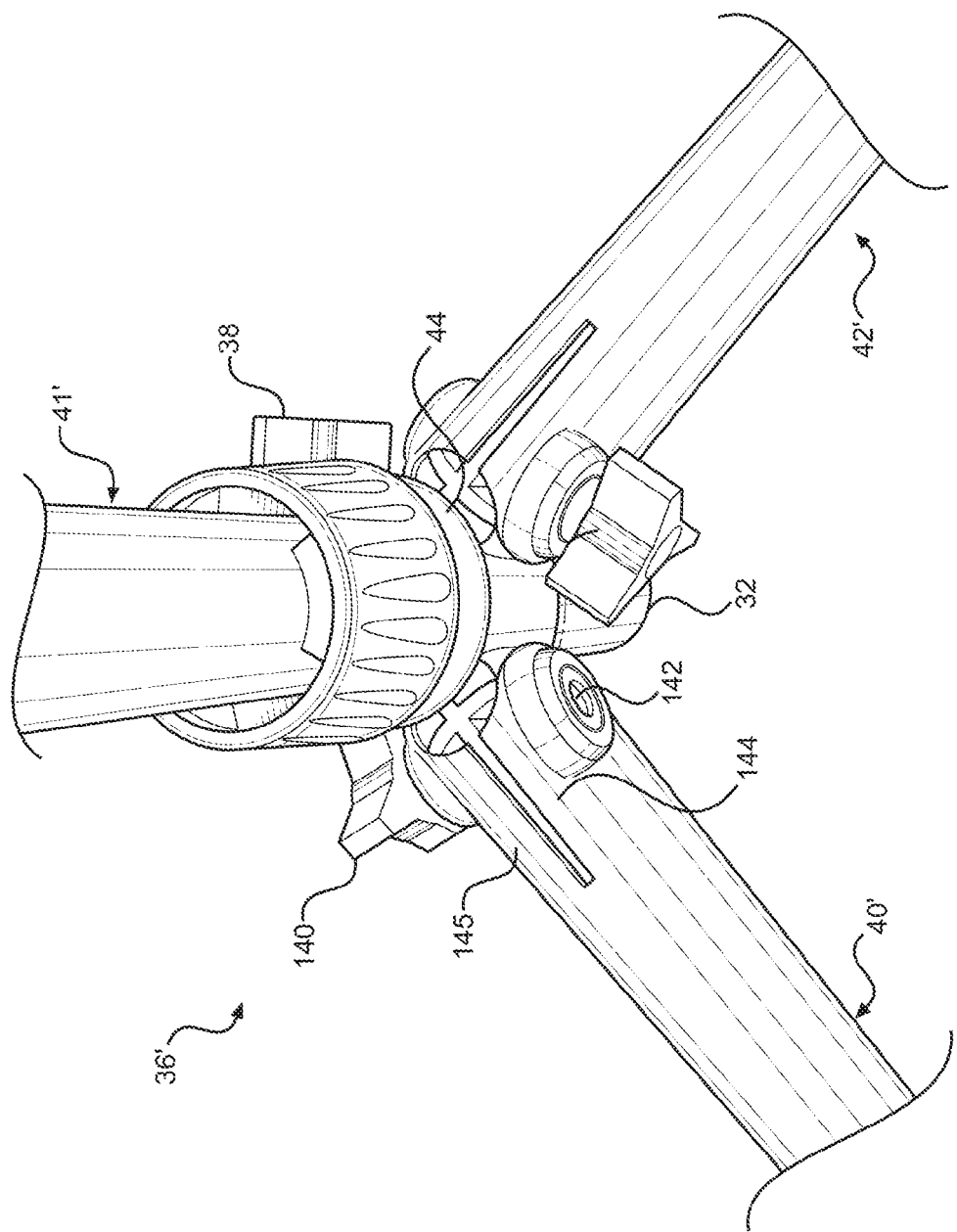
FIG. 6 is a top perspective view of an alternative base of the free-standing support system in accordance with aspects of the present invention.

FIG. 6 depicts an alternative base 36' including an alternative mechanism for locking respective legs 40', 41' and 42' in a desired position with respect to hub portion 44. Each leg 40'-42' has identical construction, so that details of the alternative mechanism for locking will be discussed only with reference to leg 40'. In embodiments, the mechanism for locking each of the legs comprises a twist lock knob 140 and a shaft 142 extending between opposing flanges 144, 145 of an end portion of the legs (e.g., leg 40'). A lobe 106' of the hub portion 46 is also received between the opposing flanges 144, 145, with the shaft 142 extending through a channel in the lobe 106' to rotatably connect the leg 40' to the lobe 106' through a ball-joint connection.

In use, when a user desires to adjust the angle of leg 40' with respect to the hub portion 46, the user turns the twist lock knob 140 in a first direction, whereby the twist lock knob 140 will move away from a locked position abutting the flange 145 to an unlocked position spaced from the flange 145. In the unlocked position, a user can adjust the angle of the leg 40' with respect to the hub portion 46. In embodiments, cooperating detent structures on one or more of the flanges 144 and 145 and lobe 106' engage one another to provide detent positions every 15 degrees, as an example, so that a user can easily rotate the leg 40' between a plurality of detent positions. Once a desired angle for the leg 40' is achieved, the user may then turn the twist lock knob 140 in a second direction, wherein the twist lock knob 140 will move from the unlocked position to a locked position abutting the flange 145. As should now be understood, when the twist lock knob 140 is in a locked position, the leg 40' is prevented from rotating with respect to hub 46.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A stand comprising:
   at least one pole;
   a holding clamp connected to the at least one pole;
   a base connected to the at least one pole, the base including:
      a hub;
      a plurality of legs pivotally connected to the hub;
      adjustment handle mechanisms connected to each of the respective legs structured to selectively lock each of the plurality of legs at a fixed position with respect to the hub; and
      a plurality of adjustable feet each of which are connected to a respective one of the plurality of legs, the adjustable feet including a first end comprising a head and a second end comprising a spike, wherein each of the plurality of adjustable feet rotate between a first position which has the spike in a stowed position within each of the plurality of legs and a second position, wherein the spike extends from each of the plurality of legs,
   wherein the at least one pole comprises a first pole in adjustable telescoping engagement with a second pole, wherein the holding clamp is attached to the first pole and the second pole is attached to the base.

2. The stand of claim 1, wherein each of the plurality of legs comprises a recessed channel on an underside thereof, wherein each of the plurality of adjustable feet is adapted to rotate between the first position wherein the spike is housed within the recessed channel, and the second position, wherein the spike is outside of the recessed channel.

3. The stand of claim 1, further comprising:
   an adjustable top clamp connecting the first pole and the second pole in a stationary position; and
   an adjustable bottom clamp connecting the second pole and the base.

4. The stand of claim 1, wherein the holding clamp comprises:
   a first portion connecting the holding clamp to the at least one pole;
   a second portion pivotally connected to the first portion, the second portion including:
      at least one securing arm pivotally connected to a surface of the second portion; and
      an adjustment knob extending through the at least one securing arm and into the second portion.

5. The stand of claim 4, wherein the holding clamp further comprises a rotation knob having a shaft extending through a slot formed in a surface of the first portion and through a back side surface of the second portion, wherein the shaft is adapted to travel along a length of the slot to adjust the angle of the second portion.

6. The stand of claim 5, wherein the slot is a crescent shaped slot, and moving the shaft along the length of the crescent shaped slot causes the angle of the second portion to adjust with respect to the at least one pole.

7. The stand of claim 1, wherein each of the plurality of legs is structured to be rotated from an extended position for supporting the stand to a stowed position.

8. The stand of claim 1, wherein:
each of the plurality of legs includes an end with a set of opposing flanges extending therefrom;
the hub includes lobes and each of the lobes is received within a respective one of the opposing flanges of a respective leg of the plurality of legs; and
each of the respective adjustment handle mechanisms includes a knob and a shaft, the shaft extends through a respective one of the plurality of lobes and a respective set of opposing flanges to rotatably connect a respective one of the plurality of legs to the hub.

9. The stand of claim 1, wherein the hub further comprises a plurality of hooks extending therefrom.

10. A free-standing support system comprising:
a telescoping pole assembly;
a base assembly connected to the telescoping pole assembly at a first end thereof, the base assembly comprising:
a hub connected to the telescoping pole assembly; and
a plurality of pivotally connected legs connected to the hub, which are rotatable between an extended position and a stowed position,
a holding clamp connected to the telescoping pole assembly, the holding clamp comprising:
a stationary portion connecting to a top portion of the telescoping pole assembly;
a rotating portion rotatably mounted to the stationary portion; and
a clamp assembly provided on a surface of the rotating portion which is structured to secure a shaft between the clamp assembly and an opposing surface,
wherein the plurality of pivotally connected legs comprise rotatable feet including a first end comprising a head and a second end comprising a spike, wherein the spike is rotatable between a stowed position and an extended position.

11. The free-standing support system of claim 10, wherein each of the legs comprises a recessed channel which houses the spike when in the stowed position.

12. The free-standing support system of claim 10, further comprising an umbrella including a canopy portion attached to a shaft portion, wherein the clamp assembly provided on the surface of the rotation portion is structured to secure the shaft of the umbrella between the clamp assembly and the opposing surface.

13. The free-standing support system of claim 10, wherein the clamp assembly provided on the surface of the rotation portion is a first arm and a second arm having a free end extending in opposing directions of the rotation portion, each of which are adjustable by a tightening mechanism.

14. The free-standing support system of claim 13, wherein the tightening mechanism includes a first adjustment knob extending through the first securing arm and into the rotating portion and a second adjustment knob extending through the second securing arm and into the rotating portion.

15. The free-standing support system of claim 13, wherein the holding clamp further comprises a rotation knob having a shaft extending through a slot formed in a surface of the stationary portion and through a back side surface of the rotating portion, wherein the shaft is adapted to travel along a length of the slot to adjust the angle of the rotating portion.

16. The free-standing support system of claim 10, wherein the hub further comprises a plurality of hooks extending therefrom.

17. A free-standing support system comprising:
at least one telescoping pole assembly;
a holding clamp connected to the at least one telescoping pole assembly, the holding clamp being structured to secure a shaft portion of an umbrella and comprising:
a stationary portion having a shaped slot and connecting to the at least one telescoping pole assembly;
a rotating portion which is rotatable about the stationary portion at an angle corresponding to that of the shaped slot; and
opposing clamping mechanisms attached to the rotating portion and which are engageable with a surface of the rotating portion; and
a base connected to the at least one telescoping pole assembly, the base comprising:
a hub;
legs pivotally connected to the hub;
handles connected to each of the respective legs to selectively lock each of the legs at a fixed position with respect to the hub; and
feet being connected to a respective one of the legs, the feet including a first end comprising a head and a second end comprising a spike, the feet being rotatable to rotate between a first position wherein the spike is stowed with the leg and a second position wherein the spike extends from the respective feet.

18. The free-standing support system of claim 17, wherein the spikes are stowed in a recessed channel of each of the legs;
the at least one telescoping pole assembly comprises a first pole telescoping with respect to a second pole;
the stationary portion of the holding clamp is connected to the first pole; and
the opposing clamping mechanisms comprise a first securing arm connected to a surface of the rotating portion and a second securing arm connected to the surface of the rotating portion spaced apart from the first securing arm.

* * * * *